(12) United States Patent
Boland (10) Patent No.: US 8,544,138 B2
(45) Date of Patent: Oct. 1, 2013

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 563 days.

(21) Appl. No.: 12/681,157

(22) PCT Filed: Sep. 30, 2008

(86) PCT No.: PCT/EP2008/063069
§ 371 (c)(1),
(2), (4) Date: Apr. 1, 2010

(87) PCT Pub. No.: WO2009/043845
PCT Pub. Date: Apr. 9, 2009

(65) Prior Publication Data
US 2010/0242203 A1    Sep. 30, 2010

(30) Foreign Application Priority Data

Oct. 1, 2007 (EP) .................................... 07117653

(51) Int. Cl.
*B60S 1/32* (2006.01)
(52) U.S. Cl.
USPC ................. 15/250.352; 15/250.351
(58) Field of Classification Search
USPC .......... 15/250.352, 250.351, 250.43, 250.34, 15/250.202, 250.04, 250.31, 250.44, 250.33, 15/250.48, 250.46, 250.361
See application file for complete search history.

(56) References Cited

U.S. PATENT DOCUMENTS

| | | | | |
|---|---|---|---|---|
| 2,191,423 A * | 2/1940 | Browne | ...................... | 15/250.32 |
| 4,133,071 A * | 1/1979 | Jaske | .......................... | 15/250.04 |
| 6,505,377 B1 * | 1/2003 | Merkel et al. | ............. | 15/250.351 |
| 6,681,440 B2 * | 1/2004 | Zimmer et al. | ............. | 15/250.32 |
| 6,742,216 B2 * | 6/2004 | Zimmer et al. | .......... | 15/250.351 |
| 7,636,981 B2 * | 12/2009 | Vandine | ................... | 15/250.351 |
| 7,937,798 B2 * | 5/2011 | Fink et al. | .................. | 15/250.32 |
| 2002/0112308 A1* | 8/2002 | Zimmer et al. | .......... | 15/250.352 |
| 2007/0011840 A1* | 1/2007 | Gilli | ........................ | 15/250.352 |

FOREIGN PATENT DOCUMENTS

| | | |
|---|---|---|
| DE | 19735301 A1 | 2/1999 |
| EP | 490833 A1 * | 6/1992 |
| EP | 0579550 A | 7/1993 |
| WO | WO 02/00479 A | 1/2002 |
| WO | WO 03/035439 A | 5/2003 |

* cited by examiner

*Primary Examiner* — Jeanette E. Chapman
(74) *Attorney, Agent, or Firm* — Robert L. Stearns; Dickinson Wright, PLLC (57) ABSTRACT

A windscreen wiper device, particularly for automobiles, includes an elongated wiper blade, which can be placed in abutment with a windscreen to be wiped. The windscreen wiper device includes a connecting device for an oscillating arm, wherein the oscillating arm is pivotally connected with its first end to the connecting device and with its second end to a mounting head on a drive shaft, and wherein the oscillating arm is provided with a longitudinally extending base and two spaced-apart sidewalls extending outwardly along opposite sides of the base to form a tube having an open face. The oscillating arm is produced integrally form a single sheet material, wherein outboard edges of the sidewalls are folded inwardly towards each other to partially close the open face of the tube.

16 Claims, 8 Drawing Sheets

WINDSCREEN WIPER DEVICE

BACKGROUND OF THE INVENTION

1. Technical Field

The present invention relates to a windscreen wiper device, particularly for automobiles, comprising an elongated wiper blade, which can be placed in abutment with a windscreen to be wiped, which windscreen wiper device further comprises a connecting device for an oscillating arm, wherein the oscillating arm is pivotally connected with its first end to the connecting device and with its second end to a mounting head on a drive shaft, and wherein the oscillating arm is provided with a longitudinally extending base and two spaced-apart sidewalls extending outwardly along opposite sides of the base to form a tube having an open face.

The present invention particularly relates to so-called flat blades, wherein an elastic elongated carrier element is provided, and wherein the wiper blade includes at least one longitudinal groove, in which groove a longitudinal strip of the carrier element is disposed. The present invention is not limited to the use in the flat blades, but can also be applied in traditional windscreen wiper devices having yokes.

2. Related Art

Such a windscreen wiper device is known from German patent publication no. 34 33 106 (SWF Auto-Electric GmbH). The oscillating arm described therein comprises an arm member pivotally connected to the mounting head by means of a pivot pin, wherein the arm member has a substantially U-shaped cross-section near the pivot pin comprising two side walls, wherein a part of the mounting head extends between the side walls and beyond the pivot pin, and wherein a spring is hooked with its first end on a pin on the mounting head. the arm member is connected to a wiper rod, wherein one end of the wiper rod extends inside the U-shaped cross-section of the arm member. The side walls of the arm member are locally folded around the wiper rod, while a holder is folded around the end of the rod. The spring of this prior art windscreen wiper device is hooked with its first end on the pin on the mounting head and with its second end on two eyes of the holder.

A disadvantage of the windscreen wiper device known from the above German patent publication is that that windscreen wiper arm consists of many constructional parts (such as a wiper rod, a holder and a mounting head pin) for accommodating the spring, for example, while complex machinery and tools are needed in manufacturing and mounting the parts, with all expenses involved.

SUMMARY OF THE INVENTION AND ADVANTAGES

It is an object of the invention to obviate this disadvantage, in the sense that at minimum costs—without using complex machinery and additional tools—a simple windscreen wiper arm with less constructional parts, for example for mounting the spring, is proposed. It is noted that the present invention is not restricted to cars, but also refers to rail coaches and other (fast) vehicles.

Thereto, according to the invention a windshield wiper arm mentioned in the preamble is characterized in that the oscillating arm is produced integrally from a single sheet material, wherein outboard edges of the sidewalls are folded inwardly towards each other to partially close the open face of the tube. the oscillating arm is thus made in one piece from a single, flat metal sheet material. Particularly, the tube is made of a metal sheet. Hence, at minimum costs—without using complex machinery and additional tools—a simple oscillating arm with less constructional parts is obtained. Because of its dedicated shape, the tube has a larger rigidity, so that its length may be less compared with prior art oscillating arms. In that case less raw material is needed to manufacture the present oscillating arm. The spring may be accommodated in the present oscillating arm in a manner as described in European patent application no. 04105114.5, publication no. 1 647 459 of the same Applicant, which is hereby incorporated by reference.

In one preferred embodiment of a windscreen wiper device in accordance with the invention the metal sheet has a thickness varying between 0.5 mm and 3 mm. Preferably, the open face of the tube has a width varying between 8 mm and 20 mm.

In another preferred embodiment of a windscreen wiper device according to the invention a spring is hooked with its first end on a pin on the mounting head and with its second end into a hole provided on a lip of the oscillating arm, wherein the lip comprises a first lip part with a first hole bend inwardly away from one sidewall of the oscillating arm, and a second lip part with a second hole bend inwardly away from another sidewall of the oscillating arm, and wherein the first and the second holes are co-axial. In the alternative, in another preferred embodiment, a spring is hooked with its first end on a pin on the mounting head and with its second end into a hole provided on a lip of the oscillating arm, wherein the lip comprises a first lip part with a first hole extending longitudinally from an outboard edge of one sidewall of the oscillating arm, and a second lip part with a second hole extending longitudinally from an outboard edge of another sidewall of the oscillating arm, and wherein the first and the second holes are co-axial. Hence, a "double" lip is obtained having a large rigidity in order to firmly hold the spring. Less raw material is needed compared to prior art windscreen wiper devices. the open face of the tube is partially closed from a location near the lip to a location near a connection to the connecting device.

In another preferred embodiment of a windscreen wiper device in accordance with the invention the first and the second lip parts extend in a plane perpendicular to the base of the oscillating arm. In the alternative, in another preferred embodiment, the first and the second lip parts extend in a plane parallel to the base of the oscillating arm.

In another preferred embodiment of a windscreen wiper device according to the invention the oscillating arm is pivotally connected with its first end to the mounting head by means of a pivot pin, wherein a part of the mounting head extends between the sidewalls and beyond the pivot pin.

The invention also refers to an oscillating arm as defined in a windshield wiper device in accordance with the invention. More in particular, the oscillating arm is provided with a longitudinally extending base and two spaced-apart sidewalls extending outwardly along opposite sides of the base to form a tube having an open face, with the special feature that the oscillating arm is produced integrally from a sheet material, wherein outboard edges of the sidewalls are folded inwardly towards each other to partially close the open face of the tube.

THE DRAWINGS

The invention will now be explained in more detail with reference to figures illustrated in a drawing, wherein.

DETAILED DESCRIPTION

FIG. 1 through 4 show a windscreen wiper device 1 according to the prior art. the windscreen wiper device is built up of an elastomeric wiper blade 2, in the longitudinal sides of which opposing longitudinal grooves 3 are formed, and of longitudinal strips 4 made of spring band steel, which are fitted in the longitudinal grooves 3. the strips 4 form a flexible carrier element for the rubber wiper blade 2, as it were, which is thus biased in a curved position (the curvature in operative position being that of a windscreen to be wiped). Neighbouring ends 5 of strips 4 are interconnected on either side of the windscreen wiper device 1 by means of connecting pieces 6. The windscreen wiper device 1 is further equipped with a connecting device 7 for an oscillating arm 8, and a spoiler 9.

Figure 1:
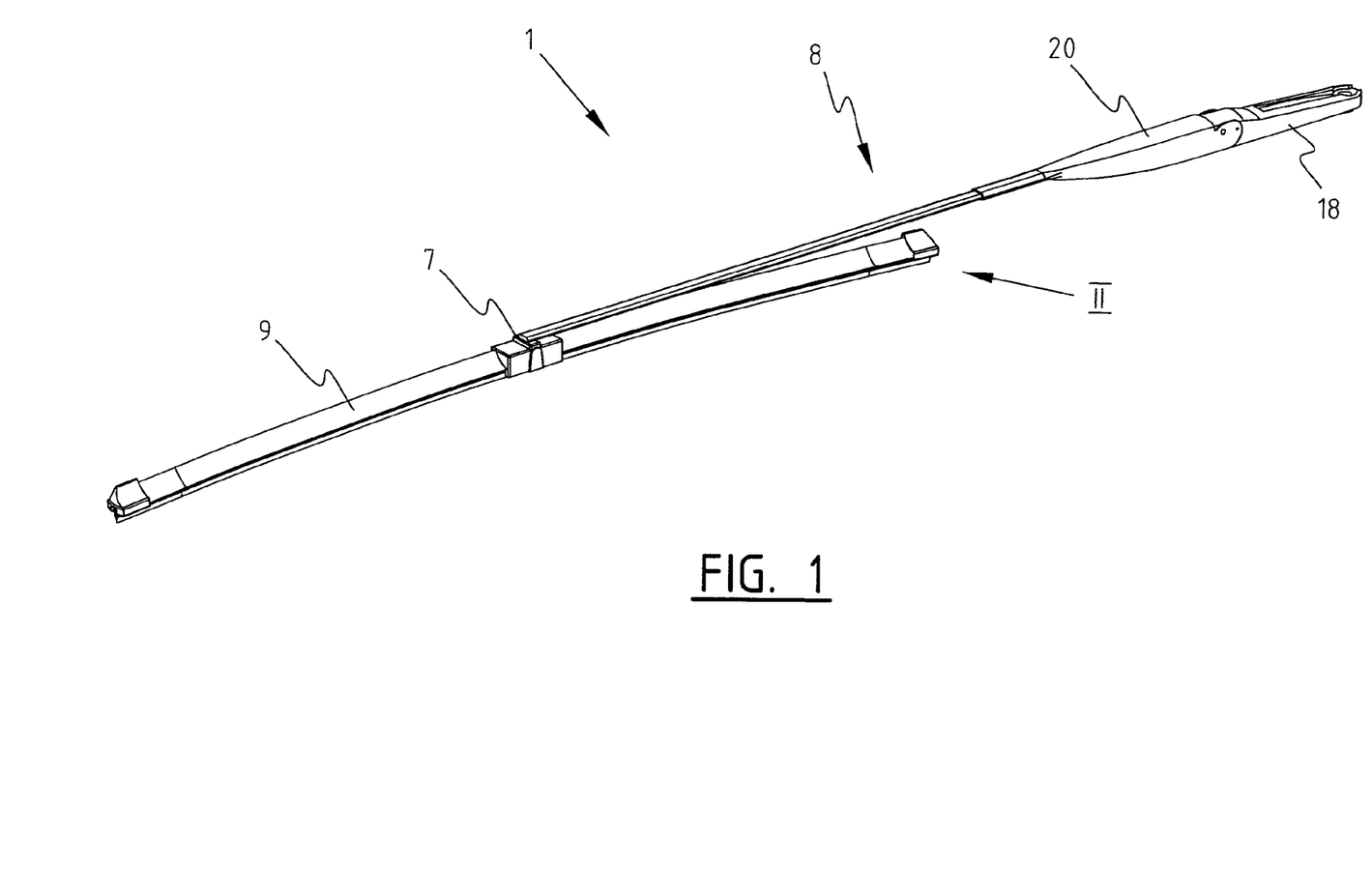
FIGS. 1 and 2 are perspective, schematic views of a prior art windshield wiper device of the "yokeless" type, wherein the oscillating arm is in a wiping position (FIG. 1) and in a mounting position (FIG. 2) respectively.
Figure 2:
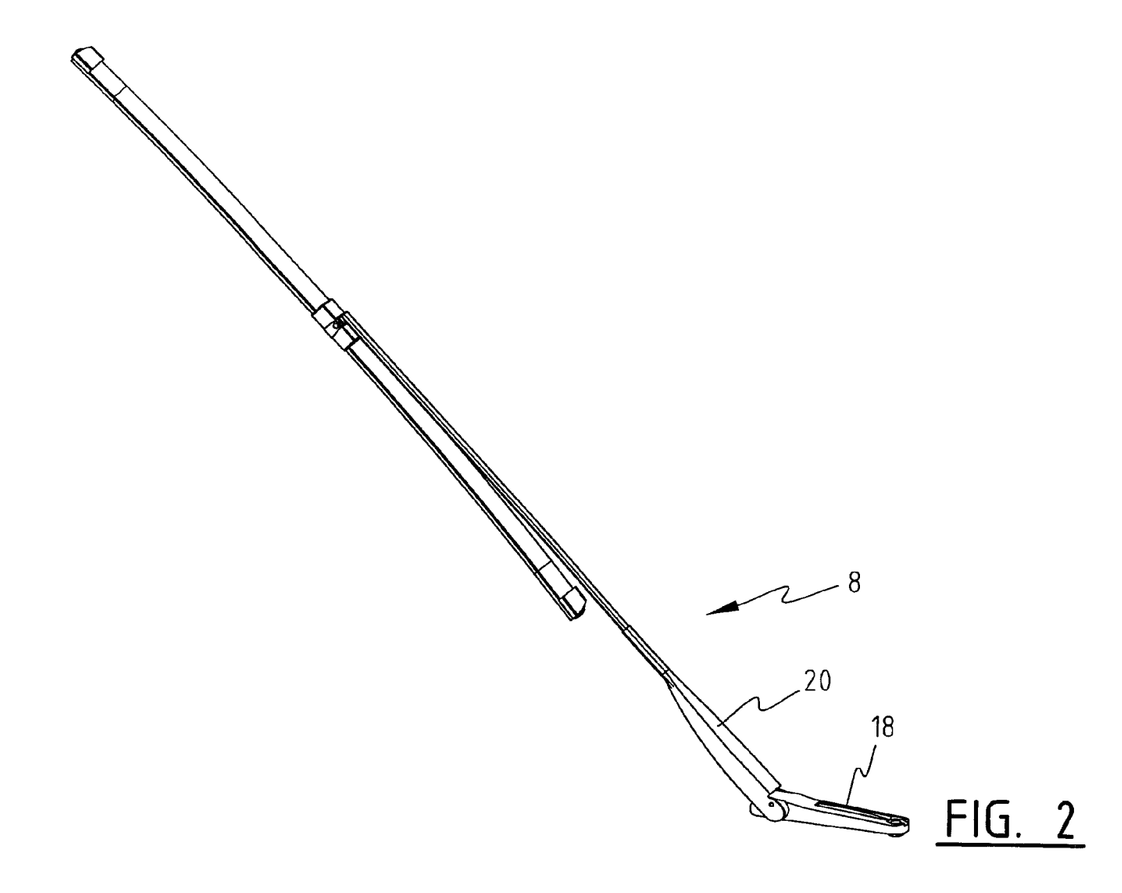
Figure 3:
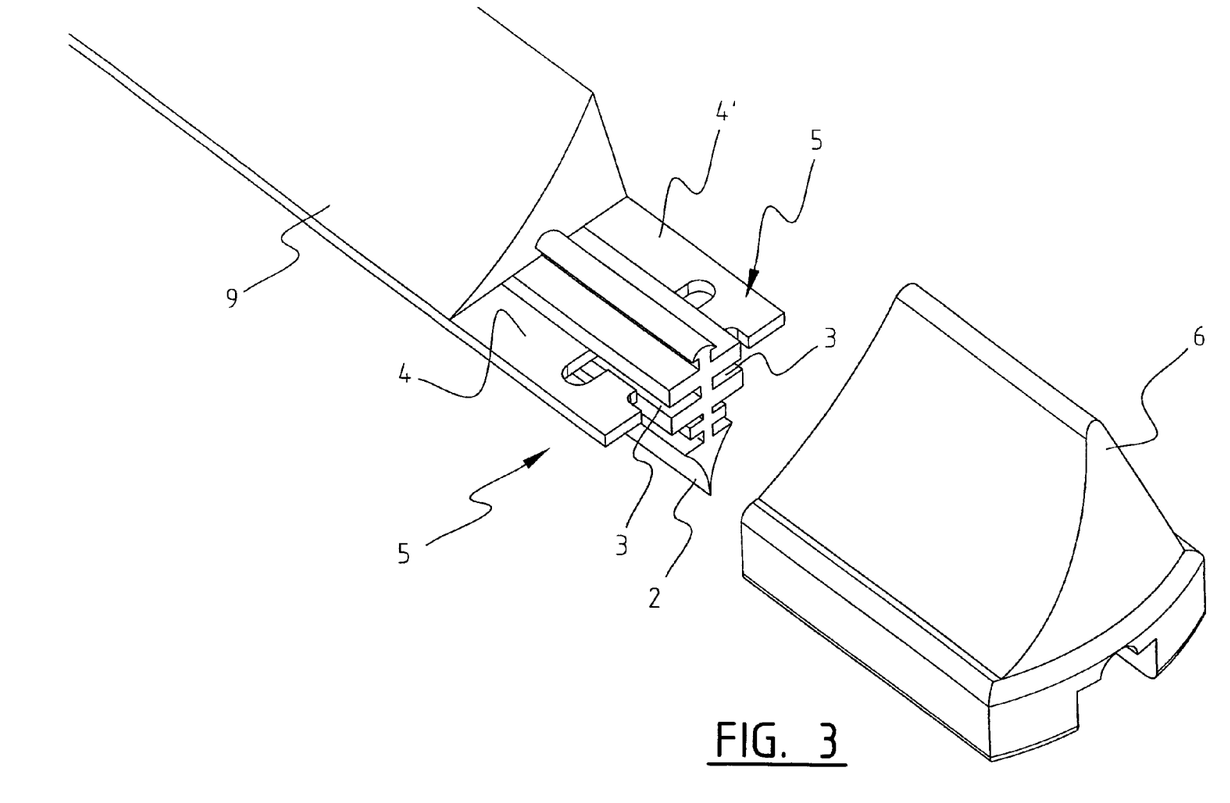
FIG. 3 shows a detail of the windscreen wiper device of FIGS. 1 and 2.

FIGS. 1 and 2 show the windscreen wiper device 1 in a wiping position and in a mounting position respectively, whereas FIG. 3 shows a free end of the windscreen wiper device 1 of FIG. 1.

Figure 4:
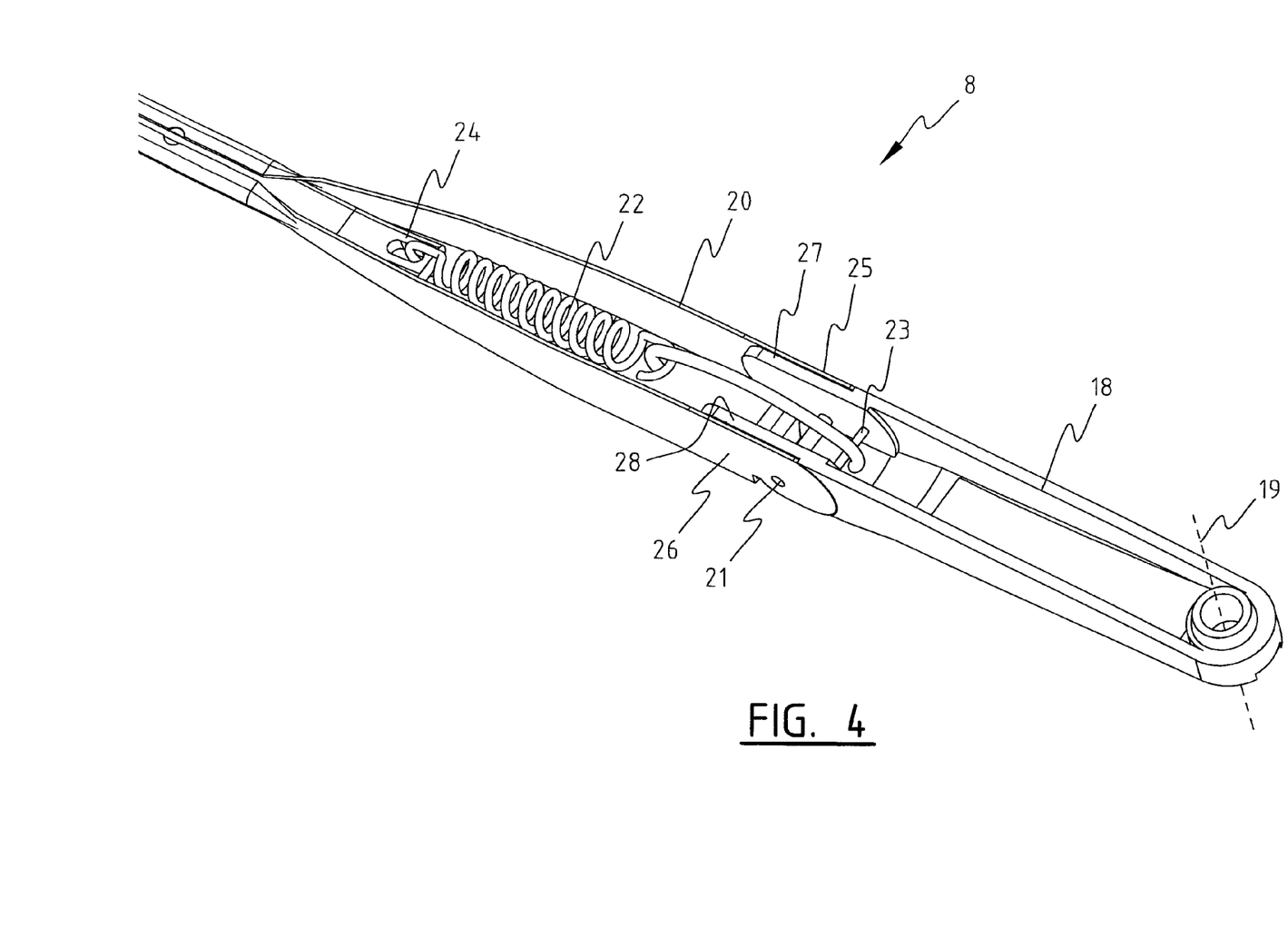
FIG. 4 is a bottom view of the oscillating arm of FIGS. 1 and 2.

As illustrated in FIG. 4 the windscreen wiper arm 8 according to the prior art comprises a plastic, aluminium or metallic mounting head 18 which can be fixed for rotation to a shaft 19 driven, via a mechanism not illustrated, by a small motor. the windscreen wiper arm 8 further comprises a metallic arm member 20 supported by the mounting head 18, wherein the arm member 20 in turn supports the wiper blade 2 with the help of the connecting device 7, as illustrated in FIG. 1. The arm member 20 is pivotally connected to the mounting head 18 by means of a pivot pin 21. A spring 22 is hooked with its first end on a pin 23 on the mounting head 18 and with its second end on to a wiper rod 24 of the arm 8 in order to ensure that the arm member 20 and thus the wiper blade 2 connected thereto is pressed onto a windscreen to be wiped. In use, the shaft 19 rotates alternately in a clockwise and in a counter-clockwise sense carrying the mounting head 18 into rotation also, which in turn draws the arm member 20 into rotation and by means of the connecting device 7 moves the wiper blade 2. A part of the mounting head 18 extends between sidewalls 25,26 of the arm member 20 and beyond the pivot pin 21, such that sidewalls 25,26 of the arm member 20 on the one hand and sidewalls 21,28 of the mounting head 18 on the other hand, abut, respectively.

Figure 5:
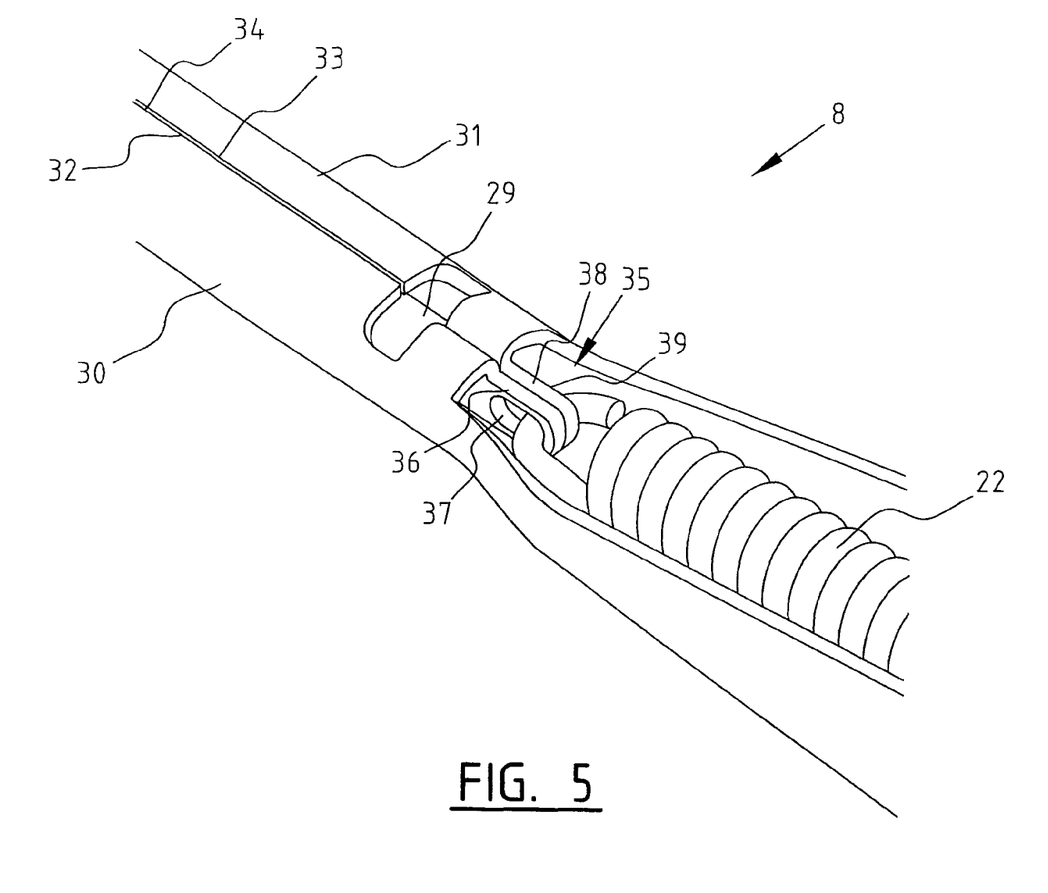
FIGS. 5, 6 and 7 are a bottom view, respectively, of an oscillating arm according to the invention to be used in a windscreen wiper device of the type of FIGS. 1 and 2.
Figure 6:
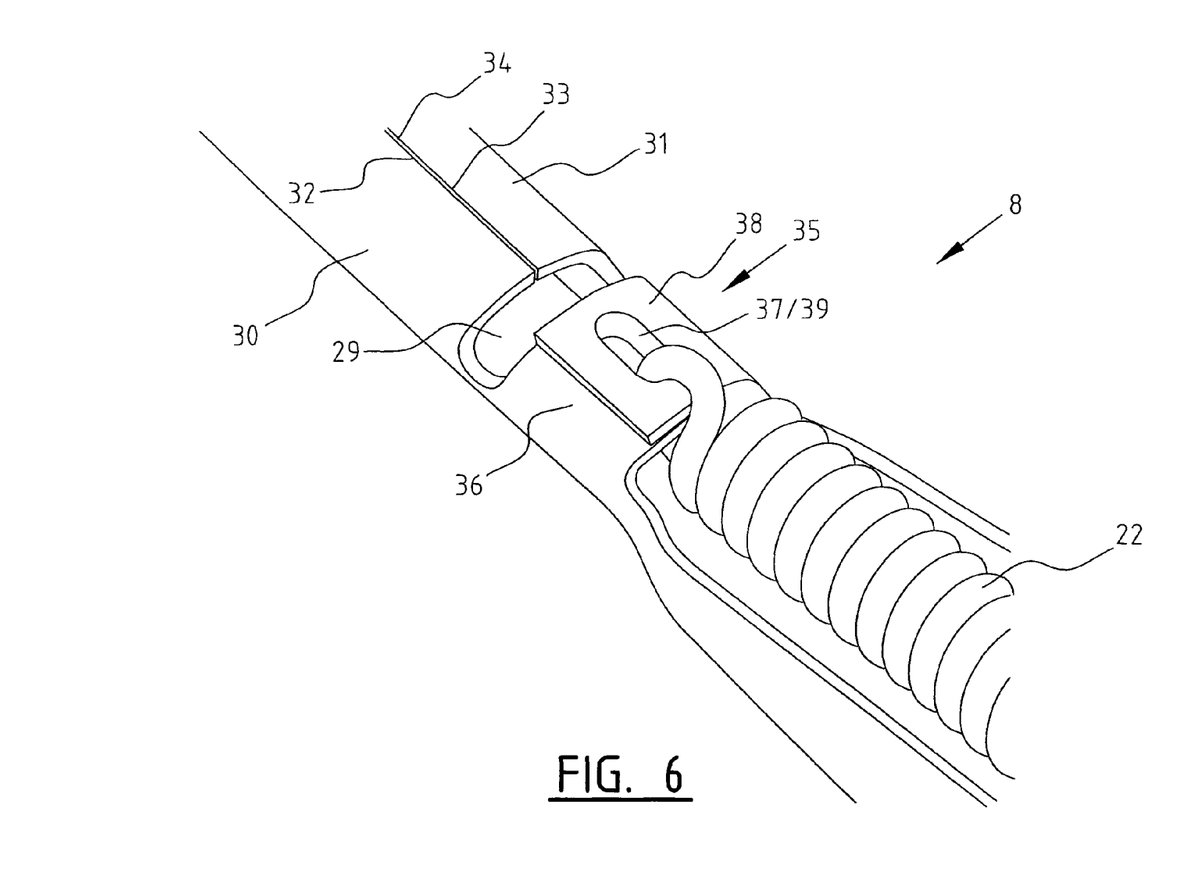
Figure 7:
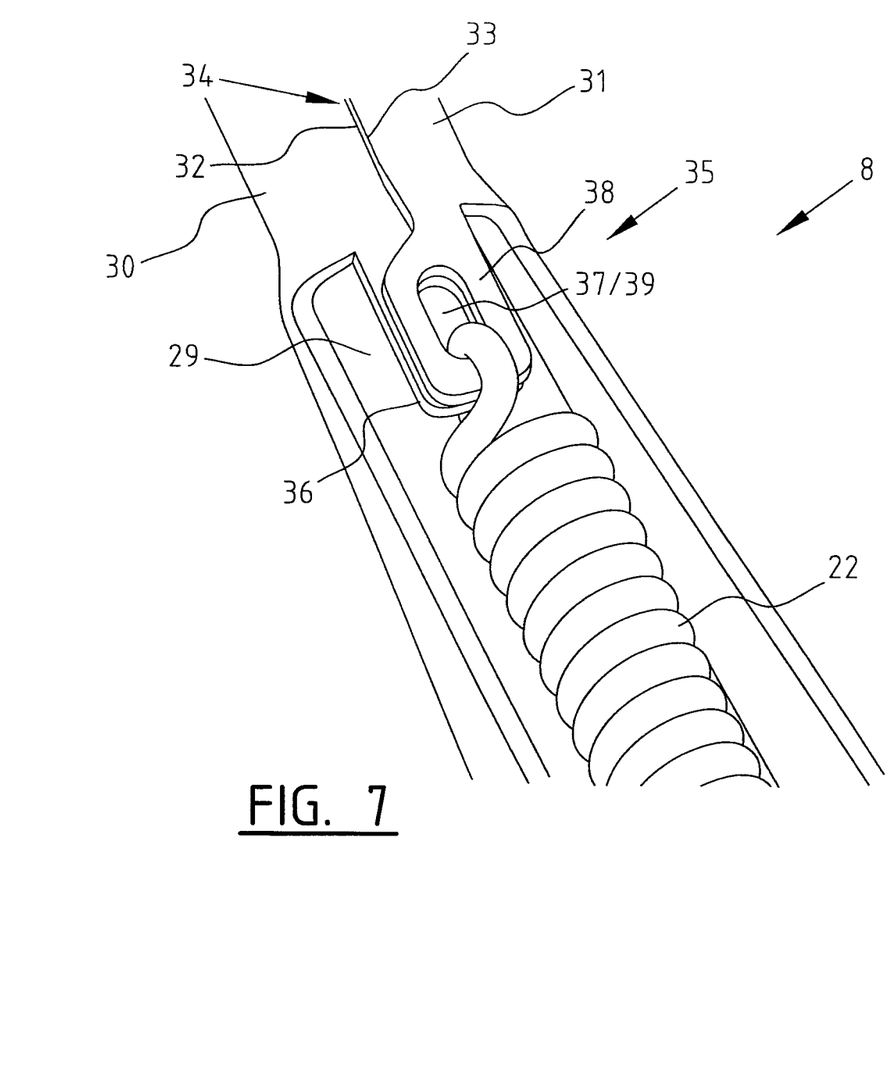

With reference to FIGS. 5, 6 and 7 according to the invention the oscillating arm 8 is provided with a longitudinally extending base 29 and two spaced-apart sidewalls 30,31 extending outwardly along opposite sides of the base 29 to form a tube having an open face. the oscillating arm 8 is produced integrally from a single, flat metal sheet, wherein outboard edges 32,33 of the sidewalls 30,31 are folded inwardly towards each other to partially close the open face of the tube. In other words, a longitudinal slot 34 is formed. The tube thus formed can be bend and twisted later on in all requested directions to obtain its definite dedicated shape. A spring 22 is accommodated inside the tube, wherein the spring 22 is hooked with its first end on a pin 21 of a mounting head 18 of the type shown in FIGS. 1, 2 and 4, and wherein the spring 22 is hooked with its second end on a lip 35 of the oscillating arm 8. Referring to FIGS. 5, 6 and 7, the lip 35 comprises a first lip part 36 with a first hole 37 bend inwardly away from one sidewall 30 of the oscillating arm 8, and a second lip part 38 with a second hole 39 bend inwardly away from another sidewall 31 of the oscillating arm 8, and wherein the first and the second holes 37,39 are elliptical and co-axial.

In the embodiment of FIG. 5 the first and the second lip parts 36,38 extend in a plane perpendicular to the base 29 of the oscillating arm 8, whereas in the embodiments of FIGS. 6 and 7 the first and the second lip parts 36,38 extend in a plane parallel to the base 29 of the oscillating arm 8.

In the embodiment of FIG. 7 the first lip part 36 extends longitudinally from the outboard edge 32 of one sidewall 30 of the oscillating arm 8, whereas the second lip part 38 extends longitudinally from the outboard edge 33 of the other sidewall 31 of the oscillating arm 8.

Parts in FIGS. 5, 6 and 7 that correspond to those of FIG. 4 are designated with the same reference numerals.

Figure 8:
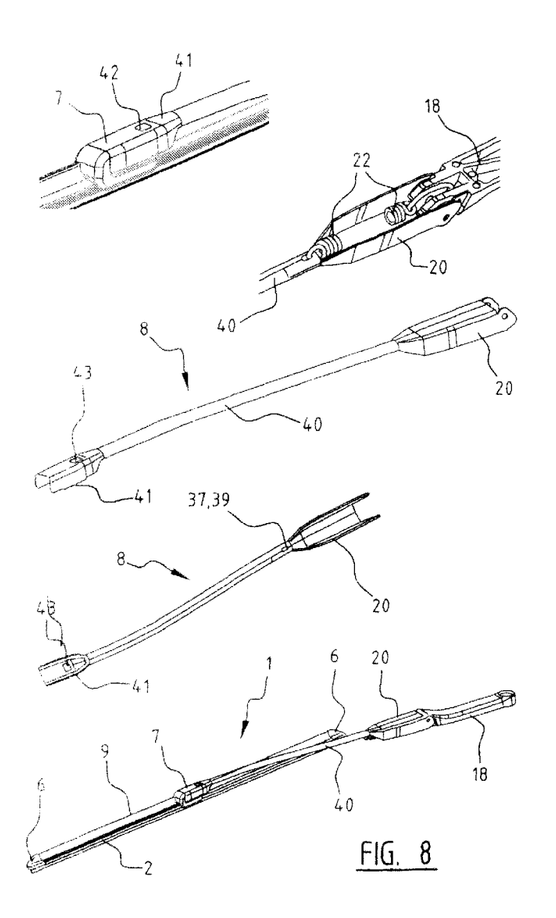
FIG. 8 shows several views on an oscillating arm in accordance with the invention to be used in a windscreen wiper device of another type.

FIG. 8 shows an oscillating arm 8 made in one piece from a single, flat metal sheet material. In other words, the one piece-oscillating arm 8 consists of an intermediate part 40 in the form of a partially closed tube, an end part 41 integral therewith to be detachably connected to the connecting device 7, as well as another end part integral therewith termed by the arm member 20. Both end parts 41, 20 have a substantially U-shaped cross-section. the end part 41 is detachably connected to the connecting device 7 through a so-called "bayonet connection", wherein a resilient tongue 42 of the connecting device 7 during a sliding movement is initially pushed in against a spring force and then allowed to spring back into a hole 43 of the end part 41, thus snapping, that is clipping the resilient tongue 42 into the hole 43. By subsequently pushing in again the resilient tonge 42 against the spring force (as if it were a push button), the connecting device 7 together with the wiper blade 2 may be released from the oscillating arm 8.

The invention is not restricted to the embodiment shown, but also extends to other embodiments falling within the scope of the appended claims. As indicated earlier, the present invention can also be applied in traditional windscreen wiper devices having yokes, as the skilled person will appreciate.

The invention claimed is:

1. A windscreen wiper device, particularly for automobiles, comprising an elongated wiper blade, which can be placed in abutment with a windscreen to be wiped, which windscreen wiper device further comprises a connecting device for an oscillating arm, wherein said oscillating arm is pivotally connected with its first end to said connecting device and with its second end to a mounting head mountable on a drive shaft, and wherein said oscillating arm is provided with a longitudinally extending base and two spaced-apart sidewalls extending outwardly along opposite sides of said base to form a tube having an open face, said oscillating arm is produced integrally from a single sheet material, wherein said oscillating arm includes an intermediate part forming said tube, an end part integral therewith, having a substantially U-shaped cross-section and being detachably connected to said connecting device through a bayonet connection, as well as another end part integral therewith, having a substantially U-shaped cross-section and being connected to said mounting head, wherein outboard edges of said sidewalls of said tube are folded inwardly towards each other to partially close said open face of said tube, wherein a longitudinal slot is formed between said outboard edges, and wherein said open face of said tube has a width varying between 8 mm and 20 mm.

2. A windscreen wiper device according to claim 1, wherein said tube is made of a metal sheet.

3. A windscreen wiper device according to claim 2, wherein said metal sheet has a thickness varying between 0.5 mm and 3 mm.

4. A windscreen wiper device according to claim 1, wherein a spring is hooked with its first end on a pin on said mounting head and with its second end into a hole provided on a lip of said oscillating arm, wherein said lip comprises a first lip part with a first hole bend inwardly away from one sidewall of said oscillating arm, and a second lip part with a second hole bend inwardly away from another sidewall of said oscillating arm, and wherein said first and said second holes are co-axial.

5. A windscreen wiper device according to claim 1, wherein a spring is hooked with its first end on a pin on said mounting head and with its second end into a hole provided on a lip of said oscillating arm, wherein said lip comprises a first lip part with a first hole extending longitudinally from an outboard edge of one sidewall of said oscillating arm, and a second lip part with a second hole extending longitudinally from an outboard edge of another sidewall of said oscillating arm, and wherein said first and said second holes are co-axial.

6. A windscreen wiper device according to claim 4, wherein said first and said second lip parts extend in a plane perpendicular to said base of said oscillating arm.

7. A windscreen wiper device according to claim 4, wherein said first and said second lip parts extend in a plane parallel to said base of said oscillating arm.

8. A windscreen wiper device according to claim 1, wherein said oscillating arm is pivotally connected with its first end to said mounting head by means of pivot pin, wherein a part of said mounting head extends between said sidewalls and beyond said pivot pin.

9. Oscillating arm having a longitudinally extending base and two spaced-apart sidewalls extending outwardly along opposite sides of said base to form a tube having an open face, wherein said oscillating arm is produced integrally from a sheet material, and includes an intermediate part forming said tube, an end part integral therewith, having a substantially U-shaped cross-section and being detachably connectable to a connecting device of a wiper blade, as well as another end part integral therewith, having a substantially U-shaped cross-section and being connectable to a mounting head, wherein outboard edges of said sidewalls of said tube are folded inwardly towards each other to partially close said open face of said tube, wherein a longitudinal slot is formed between said outboard edges, and wherein said open face of said tube has a width varying between 8 mm and 20 mm.

10. An oscillating arm according to claim 9, wherein said tube is made of a metal sheet.

11. An oscillating arm according to claim 10, wherein said metal sheet has a thickness varying between 0.5 mm and 3 mm.

12. An oscillating arm according to claim 9, wherein a spring is hooked with its first end on a pin on said mounting head and with its second end into a hole provided on a lip of said oscillating arm, wherein said lip comprises a first lip part with a first hole bend inwardly away from one sidewall of said oscillating arm, and a second lip part with a second hole bend inwardly away from another sidewall of said oscillating arm, and wherein said first and said second holes are co-axial.

13. An oscillating arm according to claim 9, wherein a spring is hooked with its first end on a pin on said mounting head and with its second end into a hole provided on a lip of said oscillating arm, wherein said lip comprises a first lip part with a first hole extending longitudinally from an outboard edge of one sidewall of said oscillating arm, and a second lip part with a second hole extending longitudinally from an outboard edge of another sidewall of said oscillating arm, and wherein said first and said second holes are co-axial.

14. An oscillating arm according to claim 12, wherein said first and said second lip parts extend in a plane perpendicular to said base of said oscillating arm.

15. An oscillating arm according to claim 12, wherein said first and said second lip parts extend in a plane parallel to said base of said oscillating arm.

16. An oscillating arm according to claim 9, wherein said oscillating arm is pivotally connected with its first end to said mounting head by means of pivot pin, wherein a part of said mounting head extends between said sidewalls and beyond said pivot pin.

* * * * *